Figure 1:
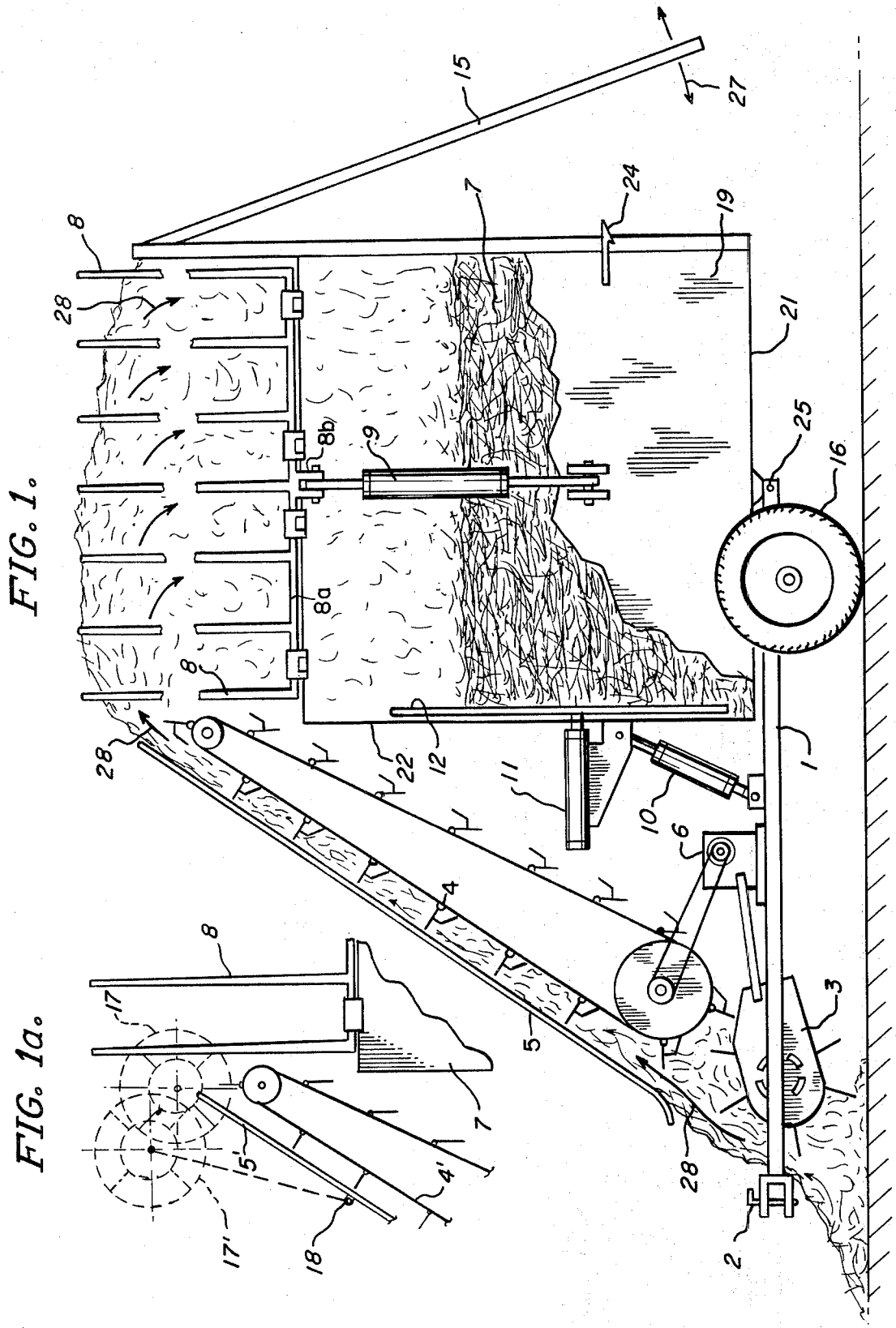

United States Patent [19]
Jebens

[11] 3,839,852
[45] Oct. 8, 1974

[54] STACK FORMER
[75] Inventor: Klaus Jebens, Hamburg, Germany
[73] Assignee: Owatonna Manufacturing Company, North Owatonna, Minn.
[22] Filed: Feb. 15, 1973
[21] Appl. No.: 332,743

[30] Foreign Application Priority Data
Feb. 15, 1972 Germany............... P2207054.8

[52] U.S. Cl. ............................................... 56/346
[51] Int. Cl............................................ A01d 87/04
[58] Field of Search ............................ 56/344–347

[56] References Cited
UNITED STATES PATENTS
| | | | |
|---|---|---|---|
| 2,500,441 | 3/1950 | Schuur et al. | 56/346 |
| 3,556,327 | 1/1971 | Garrison | 56/13.3 |
| 3,691,741 | 9/1972 | White et al. | 56/346 |
| 3,720,052 | 3/1973 | Anderson et al. | 56/346 |
| 3,754,388 | 8/1973 | Neely, Jr. | 56/346 |

Primary Examiner—Russell R. Kinsey
Attorney, Agent, or Firm—Schroeder Siegfried Ryan and Vidas

[57] ABSTRACT

A stack former which includes a container on a wheeled support with the container having fixed front and side structures with pivoted rear gate, a crop retainer bottom and an open top. The stack former includes a press structure in the form of pivoted arms mounted on the sides of the container near the top thereof to compress material in the container forming the stack. A suitable crop pickup means is mounted on the support with the container to deposit stack material into the container from the top. The bottom of the container includes means for unloading the formed stack and a wedge shaped vent forming member to form a vent groove in the stack.

10 Claims, 4 Drawing Figures

STACK FORMER

The invention relates to a stack-forming press for stalk and leaf-type farm produce, especially fodder, such as hay or similar harvested crops, to produce a compacted bundle, and consisting of a collector and conveyor mechanism, and a compacting mechanism.

In the present invention for producing the compacted bundle or stack, a collector picks up the crop and conveys it through the conveyor mechanism to a container having associated therewith a compacting mechanism. To produce uniform, individual layers in the container, it is, necessary that the entire stack-forming space in the container be evenly filled, areawise. In this manner, the free-standing stack's resistance to weather and also its cohesiveness is further improved.

To achieve uniform layer of harvested crops for compacting, the conveyor may be intermittently accelerated or may include a high speed tine-operated drum which reaches into the uppermost part of the conveyor stream to deposit the crop within the container.

This effect, however, can also be obtained by using a pickup drum to feed the conveyor, with this drum itself running at continuously, intermittently varying conveying speeds. Here, the pickup drum runs at a constant speed, corresponding to the essentially constant speed of travel of the press over the terrain.

Further, a motor can be hooked up to the conveyor mechanism, or to its uppermost part, or to some other intermittently operative acceleration device, with motor rpm and intermittent interval being continuously, stepless, adjustable. In this manner it is possible to adapt the speed and intermittent interval to the particular characteristics of the cultivated crops. This way, in accord with the invention, the conveyor belt or discharger belt runs at a continuously, intermittently varying speed. The rear wall of the stack-forming space can be raised to extend higher than the side walls, with the hinge axis at a higher location. The rear wall of the stack-forming space is extended to such height that stalk-type crops thrown toward the rear do not fall out behind the machine. The higher exit space to the rear provided by the higher location of the hinge axis is, therefore, desirable in order to ensure free discharge of the stack of stalk-type crops. The rear wall can, however, also be sidewardly hinged.

The compacting mechanism, in accord with the invention, should exert a medium pressure, perpendicularly from top to bottom. This is brought about through the use of a plate-shaped press ram introduced through the top of the stack-forming space.

Provided for, in accord with the invention, and especially advantageous, is that the press mechanism consists of cross-sectionally swiveling compacting arms arranged on the side walls, and displaying hydraulic swivel drives. These types of compacting arms have shown themselves to be very effective and inexpensive to manufacture. In the upright position, the upwardly extended compacting arms prevent the cultivated crops from falling out the sides. When pressing downwardly into the stack-forming container, these compacting arms can reach way down deep so that even only half-filled containers can be compacted. Furthermore, the compacting arms and their swiveling drives can be arranged to be upwardly movable on the sidewalls of the stack-forming space, with slots for the compacting arms provided in the sidewalls of the stack-forming space.

The compacting arms can be utilized in varying design, quantity and length. In the possible event of need for a higher pressure, several hydraulic actuators can also be arranged on each side. The compacting arms can also be joined together, totally or in part, by stiff or flexible flat elements.

The compacting arms can also run, concave-fashion, downwardly through the cross-section. In this manner, the top side of the completed stack can acquire an arched-crown shape, improving water run-off in the case of rain.

The floor area of the stack-forming container displays a roof-shaped insert. The insert, which can also be fixedly built in, extends along the center portion of the floor area so that there remain to either side of the insert equal sections of floor area that are about 1/2 to 1/3 the size of the total floor area.

The roof shaped insert in the floor provides the advantage that all layers of stalk type crops are built up in roof shaped courses from the front to the rear of the stack so that penetration of moisture from the outside does not occur. The resultant stack will contact the ground on a limited base area so that only a small ground layer becomes unusable because of the grain moisture. Further, air can be drawn through the roof shaped channel in the base of the stack to insure better drying.

The features mentioned above, therefore, consist of the fact that the space formed in compacted mass by the roof-shaped insert serves as a ventilating channel for the compacted mass, wherein it is possible also to connect an air blower not shown.

In the majority of cases, artificial ventilation of the stack can be accomplished, without special arrangements, through the essentially preserved ventilating channel in the stack that has been set out in the field, through use of a portable or transportable blower.

For the purpose of emptying the stack-forming container and for setting the completed, compacted stacks in the field or at some other location, the entire stack-forming container, is tiltably attached to the carriage frame and a hydraulically operated tilt drive is provided.

The stack-forming container is tiltably arranged to the carriage frame in order to ensure a trouble-free sliding off of the stack after backwardly tilting the stack-forming container. Tilting of the stack-forming space can preferably be effected hydraulically, but alternatively by mechanical or pneumatic means. To simplify emptying out the stack-forming space, it is further possible, in accord with the invention, to provide an unloading ram inside the stack-forming space, with a drive arranged on the outside, thereby making it possible to forcefully shove the stack out the rear. Further, the floor area can be constructed as a rolling floor. Where the roof shaped insert is used, the floor may be tri-sectioned, that is positioned to the right and left of the insert as well as underneath the insert. Such a rolling floor permits the container not only to be unloaded, but after the insert has been removed, and the direction of rotation of the floor reversed, the structure may be used for loading and later transport of the stack. For loading and unloading, the stack-forming container is tilted down backwardly and the rolling floor switched to run in the opposite direction. Therefore the principal object of this invention is to provide an improved stack forming and compacting structure.

The invention is detailed by an example in the following description, and represented by the sketches. They show:

FIG. 1. — A side view of a haystack-forming press in accord with the invention.

FIG. 1a — A modified version of the embodiment in accord with FIG. 1.

Figure 2:
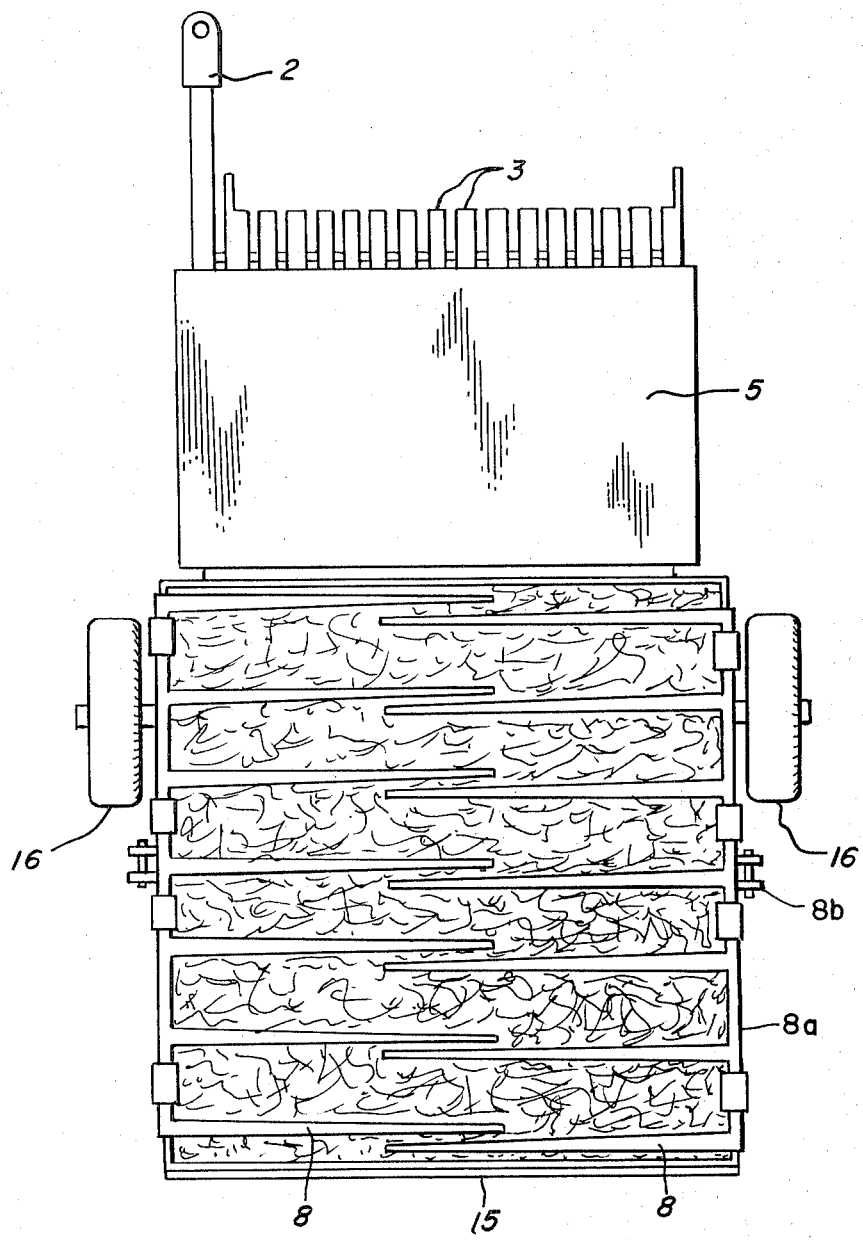

FIG. 2. — A top view of the version in accord with FIG. 1.

Figure 3:
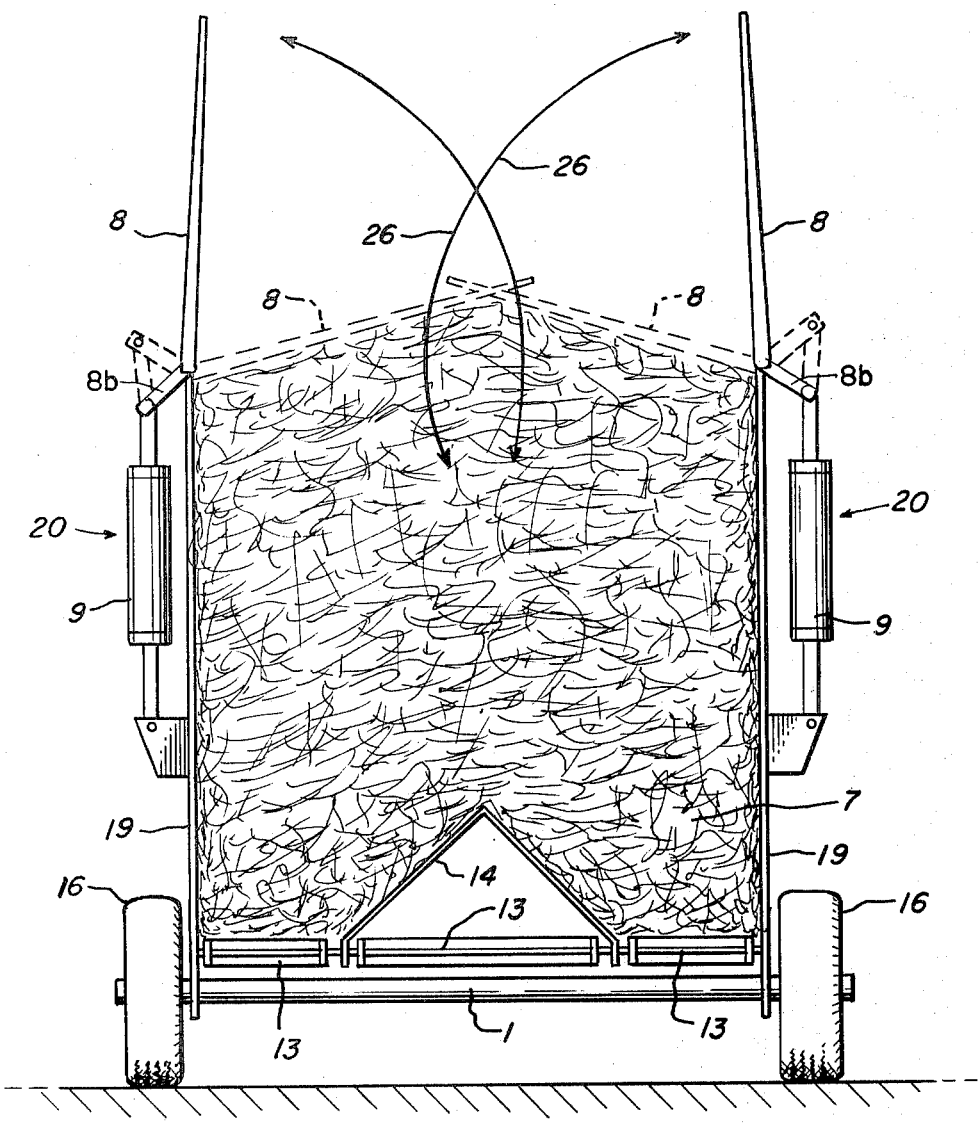

FIG. 3. — A view from behind of the version in accord with FIG. 1.

Arranged on a carriage frame 1, having wheels 16 and a hitch 2, is a pick-up drum 3, above which is a conveyor mechanism 4, a hood 5, as well as a motor 6. Motor 6 obtains its driving power from a conventional power take-off or hydraulic drive from a towing vehicle, not shown. The output shaft of motor 6 is connected to the conveyor mechanism 4 through conventional means such as a belt and pulley drive for the purpose of transferring the corresponding rotation of the motor to the pick-up drum 3 and for the purpose of providing a variable speed thereto. A stack forming structure or container is designated at 7 which defines the space for receiving and compacting the crops into a stack.

FIG. 1a shows a modified embodiment of a type that, above conveyor 4, and in this case running at constant speed and also less pickup drum 3, there is provided a tine-equipped drum 17 acting as an accelerator, with constant but higher conveying speed, and containing solid conveyor tines that are pivotally arranged. The drum 17 is pivotally mounted shaft 18 on hood 5'. The tines of tine drum 17 attack through holes in the caterpillar links when the tine drum 17 is in the extended operating position shown. In the position shown by dotted lines, the tine drum is fully outside the conveyor stream of cultivated crops. The pivotal motion about shaft 18 is periodically effected, as shown in FIG. 1, similarly as for the alternating conveying speed of conveyor mechanism 4, if necessary through motor 6, or other control arrangement not shown.

The compacting mechanism is shown generally as 20. It is attached to side walls 19 of the stack-forming container 7 and consists of compacting arms 8 connected to actuators 9 and operative to press the cultivated crops onto floor 21 of the stack forming container 7. The arms for each side wall are mounted on a shaft 8a which is journaled on the top of each side wall with the arms being in a spaced parallel relationship and of a length greater than 1/2 width of the container. The arms on each side are offset from those on the other side so as not to interfere with one another in the compacting direction. The actuators are hinged at one extremity at the side walls of the container and to flanges 8b carried by the shaft 8a eccentrically to rotate the shaft and pivot the arms with operation of the actuators. The front wall of the stack-forming container 7 is designated as 22. The rear wall 15 of the stack-forming container 7 is extended up higher above the top of the side walls 19 and is upwardly pivotable about a hinge pin 23 and lockable by means of a latch 24 when in the closed position during the compacting process.

For purposes of emptying, the stack-forming space is tiltable about axel 25 through means of actuator 10. Unloading ram 12, with actuator 11, serves for shoving the compacted mass out of the stack-forming space 7.

The rolling floor of stack-forming space 7 is designated by 13, and the roof-shaped insert by 14.

Arrows 26 indicate motion of compacting arms 8, arrows 27 motion of the rear wall 15 and arrows 28 the path for the crops.

Method of Operation

Pickup drum 3 picks up the dried stalk-type crop and guides it to conveyor mechanism 4, which then conveys it upwardly.

Through means of a special motor 6, the conveyor mechanism 4 runs faster or slower, at regular intervals, in order, thereby, through means of the varying discharge width, to fill the stack-forming space, areawise, from front to rear.

The raised compacting arms 8 prevent the sideward, and the raised rear wall 15 the rearward, fallout of the stalk-type crops.

If the stack-forming space 7 has been filled to the top of rear wall 15, compacting arms 8 hydraulically compress the stack. After compacting arms 8 are raised, renewed filling and final compression follow. This process, depending on the nature of the stalk-type crops, can be repeated several times.

Following the final compacting procedure, the compacting arms 8 are raised, the rear wall 15 is unlatched and the stack-forming space is tilted rearwardly by means of hydraulic cylinder 10. Depending upon the type of embodiment for the press, it is possible to let the stack slide out by itself by slowly driving forward, or it is pushed out by means of a hydraulic pusher arrangement 11 and 12, or by means of a built-in rolling floor.

After re-locking rear wall 15, a new compacting process can begin.

What is claimed is:

1. A stack former comprising, a vehicle including a chassis having at least a pair of wheels at one extremity and a hitch at the other extremity, a crop receiving container mounted on said chassis and having fixed front and side walls with a pivoted rear end gate wall, a crop retaining bottom and an open top, means on said vehicle for picking up a crop off of a field and directing said crop into the open top of said container, said means being mounted on said chassis, a press structure positioned on said container and including press means pivoted on the sides of said container at the top thereof and including transversely extending arms eminating therefrom in a spaced side-by-side relationship, actuator means connected to the sides of said container and operatively coupled to said press means to pivot the arms thereof from the sides of the container toward the center and into the container, means pivoting said container on said chassis, and means positioned within said container for removing a formed stack therefrom when said end gate is pivoted to an open position.

2. The stack former of claim 1 in which said end gate means is pivoted on said container above the press structure positioned on the sides thereof.

3. A stack forming structure of claim 2 in which the arms on the press structure extend from the sides thereof toward one another and are off-set from one another.

4. Stack forming structure of claim 3 in which the arms extend between the sides greater in a distance half way between the sides.

5. A stack forming structure of claim 4 in which the press structure includes separate hydraulic actuators mounted on said container and operatively pivoting said arms relative to one another.

6. The stack forming structure of claim 1 in which the press structure includes shaft means journaled on the tops of the sides of said container and having spaced parallel arms extending therefrom, and including linkage means offset from the axis of the shaft and connected to actuators for pivoting the same to pivot the arms relative to the sides of the container.

7. The stack forming structure of claim 2 in which the base of said container includes the roof shaped insert positioned in the bottom thereof and spaced from the stack removal means therein.

8. The stack forming structure of claim 7 in which the roof shaped insert serves as a ventilating channel for the compacted stack and is removable therefrom.

9. The stack forming structure of claim 8 and in which the stack removal means includes a rolling means positioned over the base of the container.

10. The stack forming structure of claim 9 in which said container is pivoted on said one end of said chassis and including actuator means connected between said chassis and the front of said container for tilting said container in the unloading of a stack therein.

* * * * *

UNITED STATES PATENT OFFICE
CERTIFICATE OF CORRECTION

Patent No. 3,839,852        Dated October 8, 1974

Inventor(s) Klaus Jebens

It is certified that error appears in the above-identified patent and that said Letters Patent are hereby corrected as shown below:

Under the Assignee's address, the word "North" should be deleted.

Signed and sealed this 1st day of April 1975.

(SEAL)
Attest:

RUTH C. MASON
Attesting Officer

C. MARSHALL DANN
Commissioner of Patents
and Trademarks